United States Patent
Weiss

(10) Patent No.: US 9,158,793 B2
(45) Date of Patent: *Oct. 13, 2015

(54) SYSTEM AND TECHNIQUE FOR EDITING AND CLASSIFYING DOCUMENTS

(75) Inventor: Stephen Michael Weiss, Brooklyn, NY (US)

(73) Assignee: Stylesight, Inc., New York, NY (US)

( * ) Notice: Subject to any disclaimer, the term of this patent is extended or adjusted under 35 U.S.C. 154(b) by 1100 days.

This patent is subject to a terminal disclaimer.

(21) Appl. No.: 13/164,274

(22) Filed: Jun. 20, 2011

(65) Prior Publication Data

US 2011/0252296 A1    Oct. 13, 2011

Related U.S. Application Data

(63) Continuation of application No. 11/726,427, filed on Mar. 21, 2007, now Pat. No. 7,992,082.

(51) Int. Cl.
*G06F 17/24* (2006.01)
*G06F 17/00* (2006.01)
*G06F 17/30* (2006.01)

(52) U.S. Cl.
CPC .................................. *G06F 17/3028* (2013.01)

(58) Field of Classification Search
CPC ............ G06F 17/3028; G06F 17/2765; G06F 17/30253; G06F 17/30705; G06F 17/24; G06F 17/241; G06F 3/04845; G06N 99/005; G06N 3/0454; G06N 3/02
USPC .................................................. 715/232, 255
See application file for complete search history.

(56) References Cited

U.S. PATENT DOCUMENTS

| | | | |
|---|---|---|---|
| 7,992,082 B2 * | 8/2011 | Weiss ........................... | 715/255 |
| 2003/0040985 A1 * | 2/2003 | Yukino .......................... | 705/27 |
| 2005/0289461 A1 * | 12/2005 | Amado et al. ................ | 715/530 |
| 2006/0218179 A1 * | 9/2006 | Gardner et al. ............... | 707/102 |
| 2006/0224964 A1 * | 10/2006 | Schwartz et al. ............. | 715/730 |

(Continued)

FOREIGN PATENT DOCUMENTS

WO    0146955 A2    6/2001

OTHER PUBLICATIONS

Martin Evening: "Introducing adobe photoshop lightroom", Chapter 1 of "The Adobe Photoshop Lightroom Book", (online) Mar. 12, 2007, pp. 1-35, XP002499533, ISBN:0-32-138543-8, URL:http://photoshopnews.com/stories/downloads/lightroom-01.pdf> (retrieved on Oct. 13, 2008).

(Continued)

*Primary Examiner* — Manglesh M Patel
*Assistant Examiner* — Ahamed I Nazar
(74) *Attorney, Agent, or Firm* — Panitch Schwarze Belisario & Nadel LLP

(57) ABSTRACT

Embodiments of a computer system which determines information associated with documents are described. During operation, this computer system receives documents (such as images). Then, the computer system determines a first set of editing instructions and classification information associated with the documents using data-processing software. Next, the computer system receives a second set of editing instructions and classification information associated with the documents. Note that the second set of editing instructions and classification information are generated by a group of individuals and include modifications and additions to the first set of editing instructions and classification information.

20 Claims, 6 Drawing Sheets

| DESCRIPTION WORDS 710 | ACCESSORIES 712 | ACTIVE WEAR 714 | BEAUTY 716 | BLOUSE/SHIRT 718 | COAT/ OUTERWEAR 720 | ... |
|---|---|---|---|---|---|---|
| ⋮ | COLOR INSPIRATIONS 722 | DENIM 724 | DRESS 726 | EMBELLISHED 728 | EVENINGWEAR 730 | |

700

(56) References Cited

U.S. PATENT DOCUMENTS

| | | | |
|---|---|---|---|
| 2008/0028314 A1* | 1/2008 | Bono et al. | 715/732 |
| 2008/0059286 A1* | 3/2008 | Nickerson et al. | 705/10 |
| 2008/0136838 A1* | 6/2008 | Goede et al. | 345/619 |
| 2009/0083653 A1* | 3/2009 | Makoff et al. | 715/780 |
| 2009/0106113 A1* | 4/2009 | Arora et al. | 705/14 |
| 2011/0252296 A1* | 10/2011 | Weiss | 715/201 |

OTHER PUBLICATIONS

Travis, Saling: "A short diversion into digital photography: Aperture vs. Lightroom", Internet Article, (online), Nov. 10, 2006, pp. 1-2, XP002499534, Retrieved from the internet: URL:://http://web.archive.org/web/20070320150455/http://westsidegardener.com/article/2006/aperture_vs._lightroom.html>, (retrieved on Oct. 10, 2008).

\* cited by examiner

SYSTEM AND TECHNIQUE FOR EDITING AND CLASSIFYING DOCUMENTS

CROSS REFERENCE TO RELATED APPLICATIONS

This application is a continuation and hereby claims priority under 35 U.S.C. 120 to U.S. Non-provisional patent application Ser. No. 11/726,427, entitled "System and Technique for Editing and Classifying Documents," by Stephen Michael Weiss, filed on Mar. 21, 2007, the contents of which are herein incorporated by reference.

BACKGROUND

1. Field of the Invention

The present invention relates to systems and techniques for organizing documents. More specifically, the present invention relates to a technique for determining editing instructions and classification information for documents.

2. Related Art

Recent advances in technology have made it possible for individuals and organizations to remotely access increasing amounts of information. For example, networks (such as the Internet) and modern search engines allow individuals to retrieve information (henceforth referred to as documents) from a large database or repository of documents (including content from multiple web pages and websites).

As the number of documents and various types of content increases, it is increasingly difficult for individuals and organizations to avoid information overload during searches of these document repositories. One approach to this problem is to restrict the number of documents provided to individuals or organizations based on an estimated relevancy of the information in the documents. For example, in response to a search query, many search engines return snippets or subsets of one or more documents (henceforth referred to as results) that closely match the search query, including: words, terms, keywords, phrases, synonyms, and/or paraphrases in or associated with the search query (henceforth collectively referred to as keywords). In addition, many search engines tailor or personalize results based on user profiles, which include user-defined interests (such as document categories) and summaries of previous user searches. Note that the ability to provide results involves identifying both the relevant documents and the relevant positions in these documents. In the case of content that is in an alphanumeric or text format, the keywords can provide the necessary classification information, which facilitates organizing (and thus, searching) of the documents in a repository.

Unfortunately, these techniques are less effective for content types other than text (such as images and videos) because keywords may not be sufficient to identify either the relevant documents or the relevant positions in these documents. Furthermore, these difficulties are compounded when the content of interest is subjective and/or dynamic (i.e., time varying) in nature (such as fashion or popular culture). Thus, it may be difficult to sort through photographs of celebrities or models to determine which photographs and/or what portion of a given photograph are currently of interest to individuals.

Hence what is needed is an improved technique for organizing documents without the problems listed above.

SUMMARY

One embodiment of this invention provides a computer system which determines information associated with documents. During operation, this computer system receives documents (such as images). Then, the computer system determines a first set of editing instructions and classification information associated with the documents using image-processing software. Next, the computer system receives a second set of editing instructions and classification information associated with the documents. Note that the second set of editing instructions and classification information are generated by a group of individuals and include modifications and additions to the first set of editing instructions and classification information.

In some embodiments, the second set of editing instructions and classification information include subjective comments associated with at least some of the documents.

In some embodiments, the group of individuals has a professional relationship with an organization that provides the computer system that receives the documents and determines the first set of editing instructions and classification information. Note that the group of individuals may be external to the organization.

In some embodiments, the computer system detects and/or corrects errors in the first set of editing instructions and classification information and/or the second set of editing instructions and classification information.

In some embodiments, the images include photographs taken at a fashion show and/or a tradeshow.

In some embodiments, the classification information in the first set of editing instructions and classification information and/or the second set of editing instructions and classification information include colors and/or types of clothing.

In some embodiments, the editing instructions in the first set of editing instructions and classification information and/or the second set of editing instructions and classification information include cropping instructions. For example, the cropping instructions for a first document associated with the second set of editing instructions and classification information may include a history of the cropping instructions generated by individuals in the group of individuals. Furthermore, the editing instructions and classification information for the first document may include distinct contributions from individuals in the group of individuals.

In some embodiments, the computer system stores a second document and the associated editing instructions in a hierarchical data structure based on classification information associated with the second document. Note that the hierarchical data structure may include categories and groups of documents. Furthermore, the second document may be assigned to one or more categories and to one or more groups of documents based on the classification information associated with the second document. In some embodiments, the second document is further assigned to one or more of the categories based on a time when the second document was received or a geographic location associated with the second document.

In some embodiments, the computer system or one or more individuals accepts or rejects editing instructions and classification information for a third document associated with the first set of editing instructions and classification information and/or the second set of editing instructions and classification information.

In some embodiments, the computer system receives a request for information from a client, and identifies a subset of the documents based on the request. Note that the subset of the documents may be identified based on the classification information associated with the subset of documents, where this subset of documents is associated with the second set of editing instructions and classification information. Then, the computer system provides the subset of the documents and associated editing instructions in the second set of editing instructions and classification information to the client. Furthermore, note that these associated editing instructions define formats in which the subset of the documents may be displayed.

Another embodiment provides a computer program product for use in conjunction with a computer system.

Another embodiment provides a method for performing at least some of the preceding operations.

BRIEF DESCRIPTION OF THE FIGURES

Note that like reference numerals refer to corresponding parts throughout the drawings.

DETAILED DESCRIPTION

Figure 1:
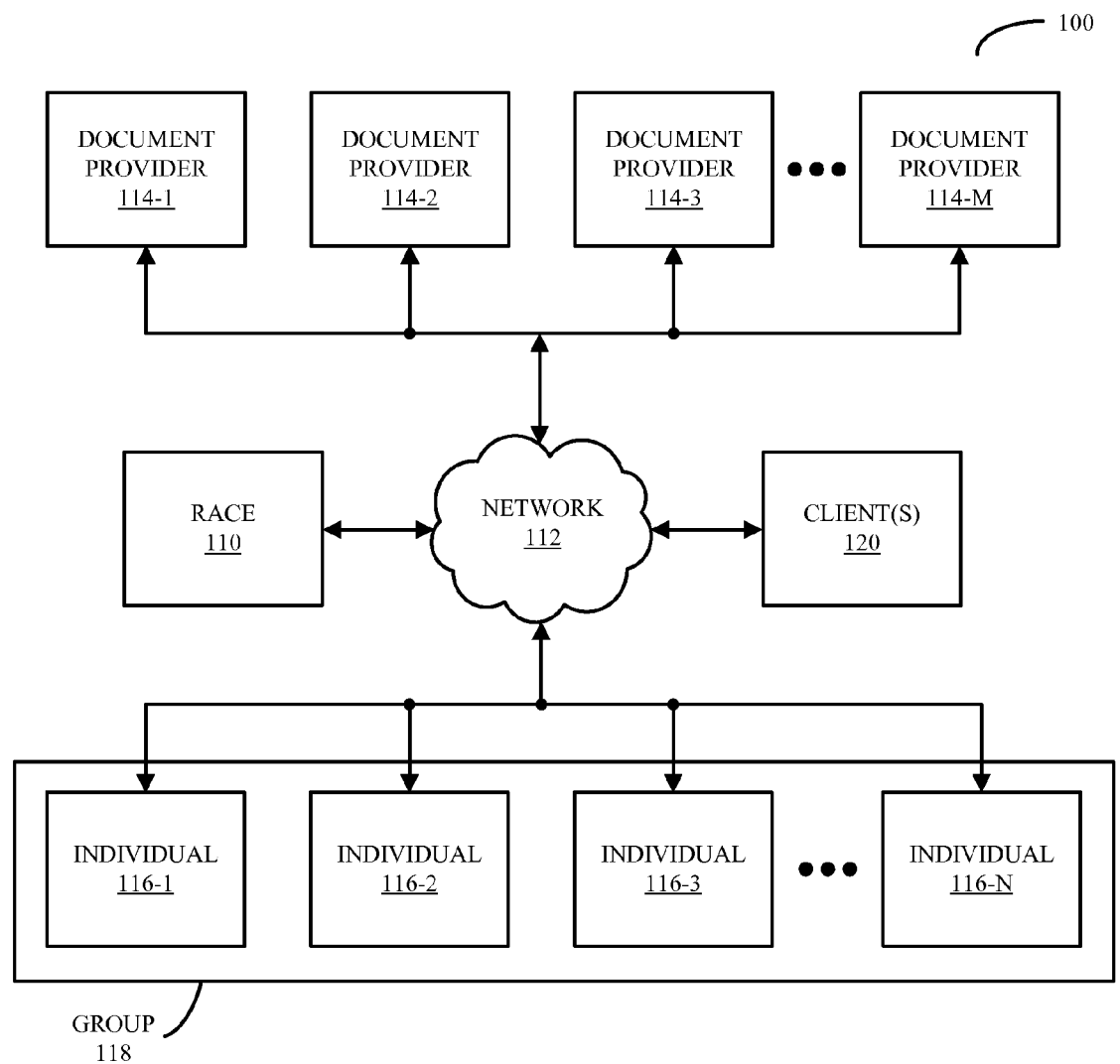
FIG. 1 is a block diagram illustrating a system including computers and servers that are networked together in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a system, a method, and a computer program product (i.e., software) for use with the system are described. These systems, software, and processes may be used to determine classification information and/or editing instructions for documents, such as images and/or videos. Such classification information and/or editing instructions may facilitate the organization of the documents in a hierarchical database or data structure, thereby enabling individuals and/or organizations (such as users of a search engine) to identify and access relevant content (i.e., content of interest) in the documents. For example, a user may provide a search query that includes or is associated with one or more keywords, and documents may be provided based on matches between the classification information and a Boolean expression that includes one or more of the keywords.

In an exemplary embodiment, the documents include photographs which include subjective content (such as images of models at one or more fashion shows). Initial classification information and/or editing instructions for these documents may be determined using image-processing software. For example, this software may determine colors or types of clothing in the documents (such as garments, textures, and/or fabrics), and may specify the location of different features of interest in a given document (such as the positions of the types of clothing) using a set of editing or cropping instructions. Note that the editing instructions may specify a display format of the given document, and these instructions may be stored with the given document for subsequent use when the given document is displayed.

Then, a group of individuals may review and, if needed, modify or add to the initial classification information and/or editing instructions. These individuals may have a professional relationship with an organization that provides the system and/or maintains the hierarchical data structure of documents. In an exemplary embodiment, the group of individuals includes outside or external contractors with expertise on the subjective content in the documents. Note that multiple individuals in the group of individuals may separately review and/or modify the current classification information and/or editing instructions associated with the given document. Furthermore, a record of the distinct modifications made by different individuals may be maintained. This may allow some or all of the modifications and/or additions to be accepted, corrected, and/or rejected during a subsequent review of the modifications by one or more individuals (who may or may not be in the group of individuals) and/or using software. In addition, in some embodiments errors in the classification information and/or editing instructions are detected and/or corrected using quality-control software.

By using computer-based and/or human-based analysis of the documents, this approach may facilitate flexible determination of subjective and/or dynamic (i.e., time varying) content of interest. In some embodiments, by determining and storing multiple versions of the classification information and/or editing instructions for the given document, it is possible to dynamically adjust the content of interest that is identified in the given document. For example, matches with a given search query may be based on a match score. This match score may be determined using a weighted summation of matches between the classification information for the given document and keywords in or associated with the given search query. As tastes or perceptions of tastes evolve, the matches returned may be revised by changing the weights. Note that in some embodiments one or more operations in the system that are performed by individuals (such as individuals in the group of individuals) may be performed using software, for example, based on a heuristic model that is trained using previous actions or decisions by the individuals.

These techniques may be implemented, at least partially, as: a stand-alone software application; as a program module or subroutine in another application; and/or in a client-server environment that is implemented using a network. Furthermore, such a program(s) may be configured to execute on a client computer, such as a personal computer, a laptop computer, cell phone, PDA, or other device capable of manipulating computer-readable data, or between two or more computing systems over a network (such as the Internet, Intranet, LAN, WAN, MAN, or combination of networks, or other technology enabling communication between computing systems). Therefore, the documents, and the associated classification information and/or editing instructions, may be stored locally (for example, on a local computer) and/or remotely (for example, on a computer or server that is accessed via a network).

We now describe embodiments of systems, devices and processes for editing and classifying documents. In particular, FIG. 1 presents a block diagram illustrating a system 100 including computers and servers that are networked together in accordance with an embodiment of the present invention. Within this system, computer 110 (or a computer system) may implement or execute Remote Access Content Editing (RACE) software. As described below, this software may facilitate a scaleable system for organizing documents (henceforth referred to as images) that are received from one or more document providers 114 (such as photography services) via a network 112. In some embodiments, the images are associated with: models at a fashion show, a tradeshow, products, designs, celebrities, popular culture, and/or news (such as wire-service images).

Using the RACE software, computer 110 may determine initial classification information and/or editing instructions for the images. For example, an image-processing module (or separate image-processing application) may determine the initial classification information and/or editing instructions using spatial and/or frequency filters. In some embodiments, the images are of models at one or more fashion shows, and the classification information includes attributes associated with at least some of the documents. Note that the categories may, at least in part, be subjective, such as: types of clothing or garment types, clothing cuts or tailoring, clothing colors, clothing fabrics, clothing texture, and/or lifestyle information (such as when it is appropriate to wear the clothing or a group that the clothing targets). In an exemplary embodiment, the categories include: accessories, active wear, beauty, blouse/shirt, coat/outerwear, color inspirations, denim, dress, embellished, eveningwear, fabric inspiration, graphics, horizontals, jackets, knit tops/t-shirt, leather/suede/fur, pants/shorts, prints, skirts, suits, sweaters, and/or intimate apparel.

Furthermore, in some embodiments the editing instructions include cropping instructions for at least some of the images. Note that the cropping instructions for a given image may specify coordinates (such as a center plus a border) corresponding to one or more portions of the given image. Thus, the image-processing module or software may identify multiple portions of the given image that may be of interest.

In some embodiments, such as those where the images include subjective content, it may be necessary to refine, add to, and/or modify the initial classification information and/or editing instructions. This may be performed by one or more individuals 116 in a group of individuals 118 who access image files using the network 112. For example, a given individual may select one or more attributes or categories to associate with one or more images from a pallet of description words that are provided by the RACE software. In an exemplary embodiment, the given individual clicks on an attribute using a pointer device (such as a mouse), drags it over a displayed image, and releases it to define such an association.

Note that the individuals 116 may have a professional relationship with an organization that provides the RACE software and/or the service facilitated by the system 100 (for example, individuals 116 may be freelancers in the fashion industry). However, as noted previously, in some embodiments another software module or application may perform at least some of the operations implemented by the individuals 116. For example, the modifications may be based on a heuristic model that is trained using previous actions or decisions by one or more of the individuals 116.

Also note that multiple individuals 116 may modify the classification information and/or editing instructions associated with the given image over a time interval. Furthermore, the RACE software may track and/or store these distinct modifications and/or subjective comments for the given document that are provided by these multiple individuals. For example, the classification information for the given document may include meta data associated with the individual(s) who modified it. In some embodiments, a history of different cropping instructions for the given image may be stored, either on the computer 110 or on another computer or server that may be accessed using the network 112.

After and/or while the individuals 116 are providing the modifications, the system 100 may detect and, if necessary, correct errors in the classification information and/or editing instructions for the images. In some embodiments, a quality-control module or application executing on computer 110 performs these functions. However, in some embodiments one or more individuals (who may be in the group 118 or who may be external to the group 118) perform the detection and/or correction operations. Furthermore, in some embodiments yet another software module or application may be used. Note that this module or application may be based on a heuristic model that is trained using previous actions or decisions by one or more individuals.

During this quality-control process, additions, modifications and/or comments provided by one or more individuals 116 for one or more images may be accepted, changed, and/or rejected. For example, some of all of the modifications and/or comments provided by one of the individuals 116 for multiple images may be rejected. In this case, the rejected changes may be deleted.

Then, the images may be organized and stored (locally and/or remotely) in a relational or a hierarchical database or data structure based on the accepted classification information and/or editing instructions for the images. The given image may be stored along with its associated editing instructions, i.e., the full image may be stored. This approach may allow multiple versions of the image to be subsequently displayed on one or more client computers 120 based on the editing instructions (for example the given image may be cropped when it is rendered). It also allows the editing instructions to be changed, as need, in the future.

Note that the data structure may include groups of images (which are henceforth referred to as batches), and images may be assigned to one or more categories and/or one or more batches. For a given image, this assignment may include a full copy of the given image or a pointer to a copy of the given image. In some embodiments, the given image is also assigned to a given category and/or a given batch based on: a time when the given image was received; a time when the given image was produced (such as when a photograph was taken); and/or a geographic location associated with the given image (such as a location where a photograph was taken). For example, runway images (which may be a category) may be split up based on a city where a fashion show occurred and/or a day when the images were received (which, in turn, may define one or more batches).

Note that the batches may be selected in order to keep the size of the groups of images manageable. In an exemplary embodiment, a given batch may include 500-1000 runway images or 100 images from a tradeshow(s). In another example, a category is Fall 2006, and there are multiple sub-categories corresponding to different types of clothing. In addition, there may be a batch entitled NewYork1, and multiple sub-batches, such as NewYork1 (beauty), NewYork1 (coats), etc. Thus, the categories/sub-categories and the batches/sub-batches may constitute two flat trees or hierarchies that interact with each other, i.e., there may be two parent-child relationship pathways in the data structure.

One or more users of computers 120 may access the stored images and associated editing instructions based on the classification information. For example, one or more keywords in or associated with a search query provided by a given user using a search engine may match the classification information for a set of images.

Once such as set is identified, the RACE or other software may provide the images, the associated editing instructions, and/or the classification information to the given user. This user (such as a buyer at a department store, a fashion designer, or a magazine publisher) may use this information to guide fashion design, purchasing, and/or magazine publishing. In some embodiments, the given user pays the provider of the RACE software and/or the data structure for this service.

In some embodiments, the images may be received at a given client computer in the client computers 120 and one or more of the images may be rendered using a browser. Note that in some embodiments, the RACE software passages the images prior to the providing, for example, by performing transformations of the images into other formats. Furthermore, in some embodiments the set of images is provided as a batch, i.e., as one big file. This file may be compressed (for example, using a Joint Photographic Experts Group compression technique), and this compression may preserve the hierarchical or directory information in the data structure. After the file is decompressed on the client computer, this directory information may be used to split up or subdivide the file.

As noted previously, software applications in the system 100 may stand-alone applications or may be embedded in another application(s) (such as a software module). Furthermore, in some embodiments the individuals 116 and/or users of the client computers 120 may use tools associated with the RACE software that are embedded in a web page (once again, either as a stand-alone application or as a portion of another application). This web page may be provided by the computer 110 via network 112. In an exemplary embodiment, these tools include one or more software modules or packages written in JavaScript™ (i.e., the income-tax preparation tool includes programs or procedures containing JavaScript instructions), ECMAScript (the specification for which is published by the European Computer Manufacturers Association International), VBScript™ (a trademark of Microsoft, Inc.) or any other client or server-side scripting language. In other words, these tool may include programs or procedures containing JavaScript, ECMAScript instructions, VBScript instructions, or instructions in another programming language suitable for rendering by a browser or another client application on computers and/or servers in the system 100.

Note that the material included in the system 100 may be a sensitive nature. As a consequence, in some embodiments the individuals 116 and/or the user of the client computers 120 may provide one or more security tokens (such as PIN codes, user names, and/or passwords) in order to use the RACE software and/or to access stored images, classification information, and/or editing instructions. In addition, in some embodiments the stored files, the stored information, and/or data communicated over the network 112 are encrypted. For example, communication may utilize a protocol such as HyperText Transfer Protocol Secure (HTTPS). Furthermore, in some embodiments the system 100 includes fewer or additional components, two or more components are combined into a single component, and/or a position of one or more components may be changed.

Figure 2:
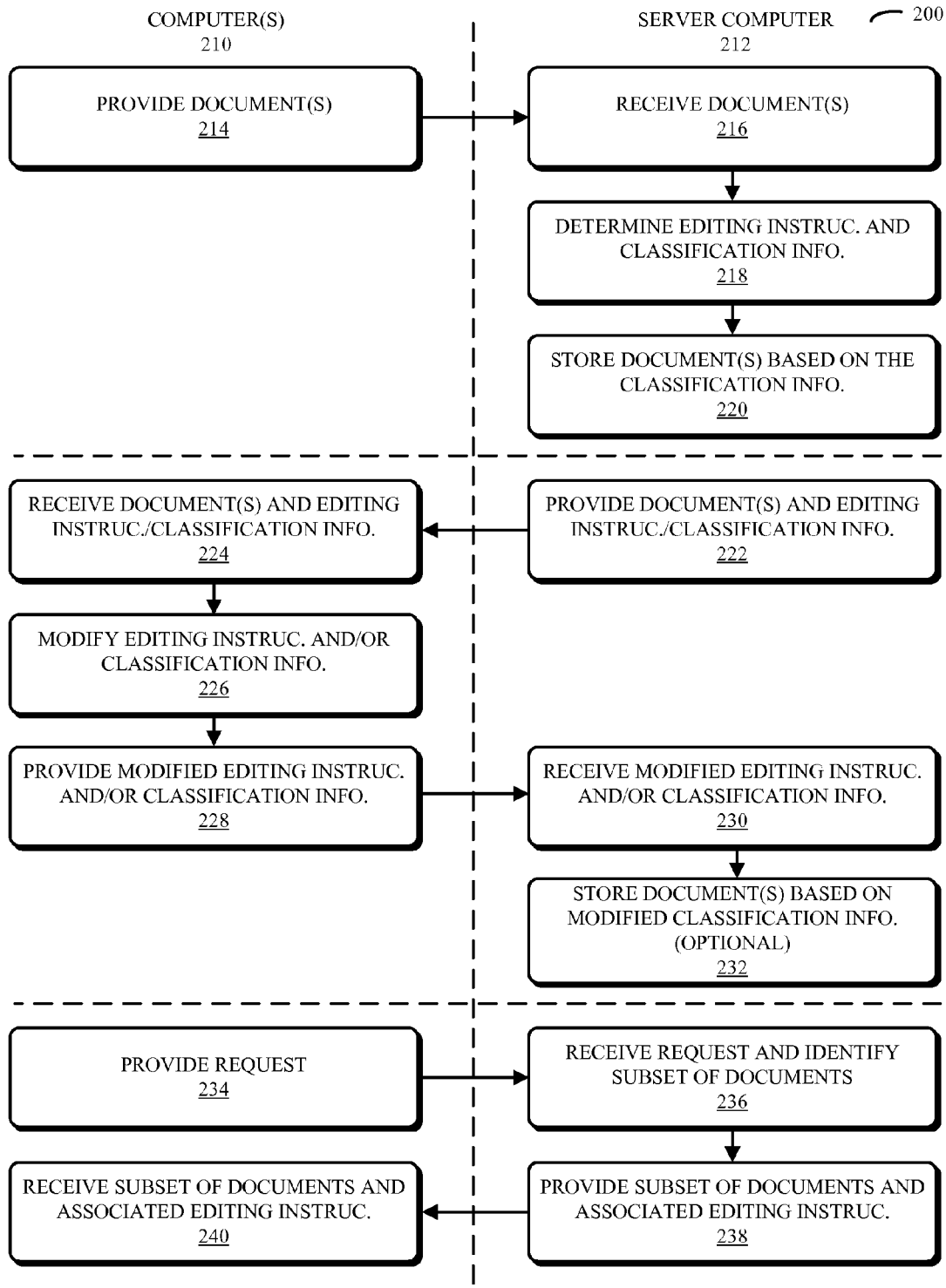
FIG. 2 is a flow chart illustrating a method for determining information associated with documents in accordance with an embodiment of the present invention.

We now discuss methods for editing and classifying documents. More specifically, FIG. 2 presents a flow chart illustrating a method 200 for determining information associated with documents in accordance with an embodiment of the present invention. During this method, a first computer in computers 210 provides documents (214) to a server computer 212. Server computer 212 receives these documents (216). Then, the server computer 212 determines editing instructions and classification information (218) for the documents, and stores the documents based on the classification information (220).

Later, the server computer 212 provides documents, editing instructions, and/or classification information (222) to a second computer in the computers 210. Note that in general the second computer may be different than the first computer. This second computer receives these documents, editing instructions, and/or classification information (224). Then, the second computer (or an individual using the second computer) modifies the editing instructions and/or classification information (226), and provides the modified editing instructions and/or classification information (228) to the server computer 212. Next, the server computer 212 receives the modified editing instructions and/or classification information (230), and optionally stores one or more of the documents based on the modified classification information (232).

Clients of the system 100 (FIG. 1) may provide requests (234) using a third computer in the computers 210. Note that in general the third computer may be different than the other computers in the method 200. Server computer 212 receives the request and identifies a subset of the documents (236). Then, the server computer 212 provides the subset of the documents and associated editing instructions (238). Next, the third computer receives the subset of the documents and associated editing instructions (240), and renders the subset of the documents in a format that is based on the editing instructions.

Figure 3:
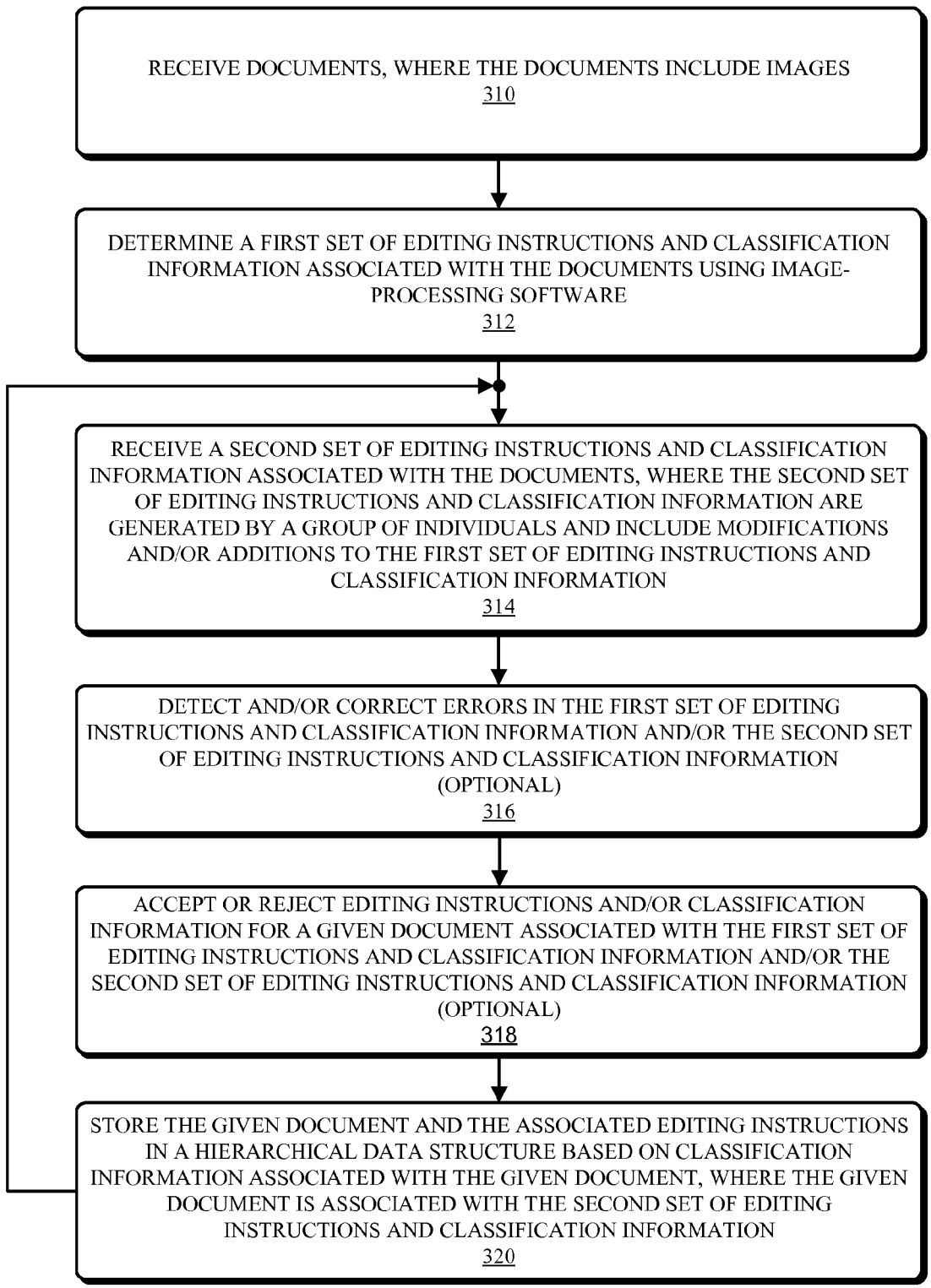
FIG. 3 is a flow chart illustrating a method for determining information associated with documents in accordance with an embodiment of the present invention.

FIG. 3 presents a flow chart illustrating a method 300 for determining information associated with documents in accordance with an embodiment of the present invention. During this method, a system (such as the system 100 in FIG. 1) receives documents (310). Note that these documents may include images. Then, image-processing software executing on a computer in the system determines a first set of editing instructions and classification information associated with the documents (312).

Next, the system receives a second set of editing instructions and classification information associated with the documents (314). Note that the second set of editing instructions and classification information may be generated by a group of individuals and may include modifications and/or additions to the first set of editing instructions and classification information.

In some embodiments, the computer optionally detects and/or corrects errors in the first set of editing instructions and classification information and/or the second set of editing instructions and classification information (316). Furthermore, in some embodiments the system optionally accepts or rejects editing instructions and/or classification information for a given document associated with the first set of editing instructions and classification information and/or the second set of editing instructions and classification information (318).

In addition, the system stores the given document in a hierarchical data structure based on the classification information associated with the given document, where the given document is associated with the second set of editing instructions and classification information (320). Furthermore, in some embodiments the system repeats, one or more times, the receiving (314), the detecting and/or correcting (316), the accepting or rejecting (318), and/or the storing (320) operations.

Note that in some embodiments there may be additional or fewer operations in the method 200 (FIG. 2) and/or the method 300, the order of the operations may be changed, and two or more operations may be combined into a single operation.

Figure 4:
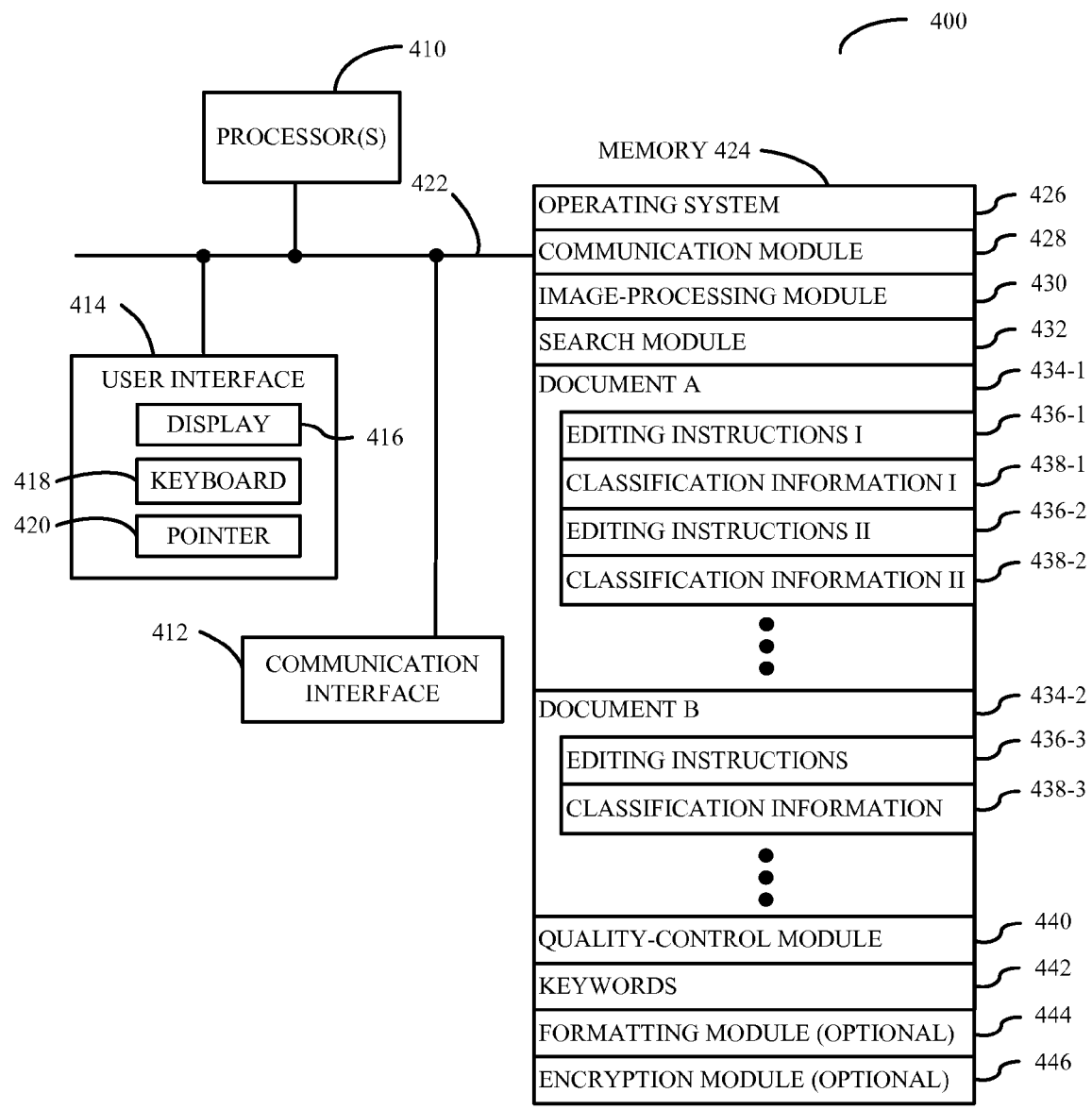
FIG. 4 is a block diagram illustrating a computer system in accordance with an embodiment of the present invention.

We now describe embodiments of a computer or server, such as the computer 110 (FIG. 1). More specifically, FIG. 4 presents a block diagram illustrating a computer system 400 in accordance with an embodiment of the present invention. Computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include a display 416, a keyboard 418, and/or a pointer 420, such as a mouse.

Memory 424 in the computer system 400 may include volatile memory and/or non-volatile memory. More specifically, memory 424 may include ROM, RAM, EPROM, EEPROM, FLASH, one or more smart cards, one or more magnetic disc storage devices, and/or one or more optical storage devices. Memory 424 may store an operating system 426 that includes procedures (or a set of instructions) for handling various basic system services for performing hardware dependent tasks. While not explicitly indicated in the computer system 400, in some embodiments the operating system 426 includes a web browser. The memory 424 may also store procedures (or a set of instructions) in a communication module 428. The communication procedures may be used for communicating with one or more computers and/or servers, including computers and/or servers that are remotely located with respect to the computer system 400.

Memory 424 may include multiple program modules (or a set of instructions), including image-processing module 430 (or a set of instructions), search module 432 (or a set of instructions), and quality-control module 440 (or a set of instructions). In addition, memory 424 may include a data structure which includes documents 434, as well as associated editing instructions 436 and classification information 438. Note that the search module 432 may identify and return results (such as a subset of the documents 434) based on keywords 442 in or associated with a received search query.

Furthermore, in some embodiments memory 424 includes optional formatting module 444 (or a set of instructions) and/or optional encryption module 446 (or a set of instructions). Note that the optional formatting module 444 may be used to change a format of one or more of the documents 434 and/or associated information stored in memory 424.

Instructions in the various modules in the memory 424 may be implemented in a high-level procedural language, an object-oriented programming language, and/or in an assembly or machine language. The programming language may be compiled or interpreted, i.e., configurable or configured to be executed by the one or more processing units 410.

Although the computer system 400 is illustrated as having a number of discrete components, FIG. 4 is intended to provide a functional description of the various features that may be present in the computer system 400 rather than as a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more ASICs and/or one or more digital signal processors DSPs.

Computer system 400 may include fewer components or additional components, two or more components may be combined into a single component, and/or a position of one or more components may be changed. In some embodiments the functionality of the computer system 400 may be implemented more in hardware and less in software, or less in hardware and more in software, as is known in the art.

Figure 5:
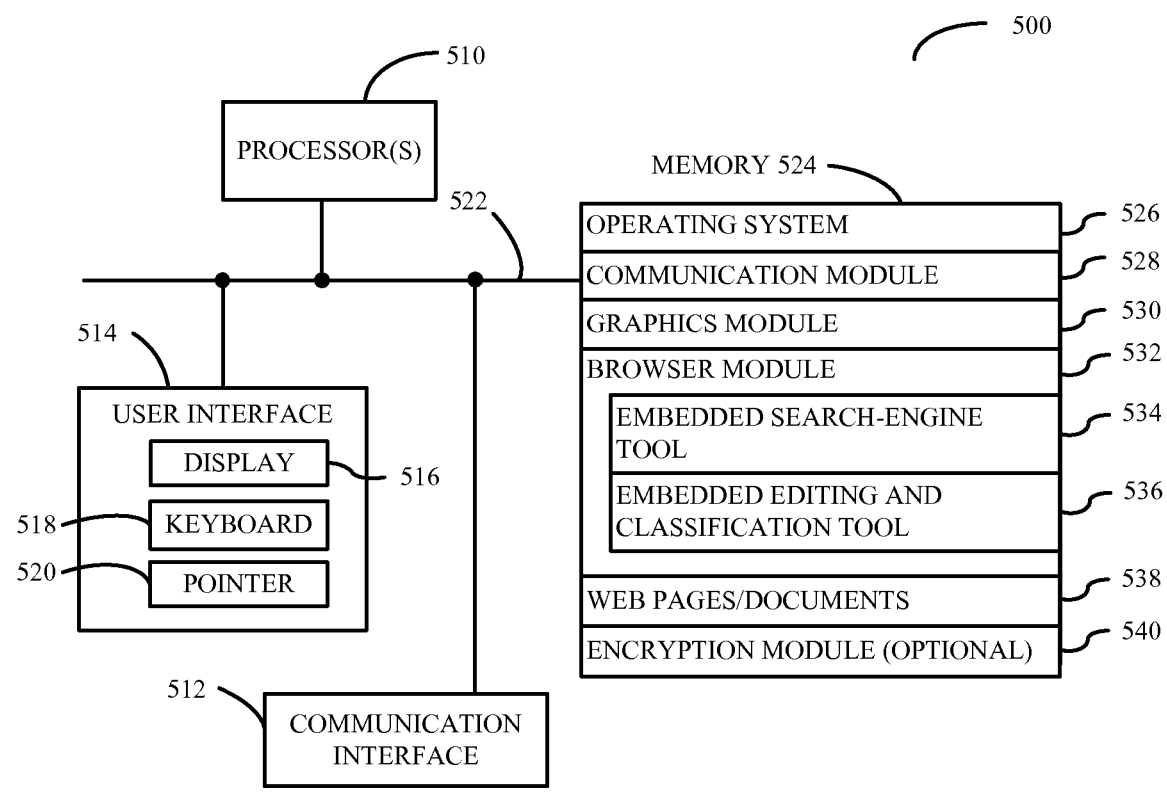
FIG. 5 is a block diagram illustrating a computer in accordance with an embodiment of the present invention.

FIG. 5 presents a block diagram illustrating a computer 500 (such as one of the computers 120 in FIG. 1, or a computer used by one of the individuals 116 in FIG. 1) in accordance with an embodiment of the present invention. Computer 500 may include one or more data processors or central processing units (CPUs) 510, a communication interface 512 for communicating with other computers, servers and/or clients, a user interface 514, a memory 524, and one or more signal lines 522 for coupling these components to one another. Note that the one or more processing units 510 may support parallel processing and/or multi-threaded operation, the communication interface 512 may have a persistent communication connection, and the one or more signal lines 522 may constitute a communication bus. Moreover, the user interface 514 may include a display 516, a keyboard 518, and/or a pointer 520 (such as a mouse).

Memory 524 in the computer 500 may include volatile memory and/or non-volatile memory. More specifically, memory 524 may include ROM, RAM, EPROM, EEPROM, FLASH, one or more smart cards, one or more magnetic disc storage devices, and/or one or more optical storage devices. Memory 524 may store an operating system 526 that includes procedures (or a set of instructions) for handling various basic system services for performing hardware dependent tasks. The memory 524 may also store procedures (or a set of instructions) in a communication module 528. The communication procedures may be used for communicating with one or more computers and/or servers, including computers and/or servers that are remotely located with respect to the computer 500. In addition, the communication procedures may be used for communicating with a computer system that implements a search engine.

Memory 524 may also include multiple program modules (or a set of instructions), including a graphics module 530 (or a set of instructions) and a browser module 532 (or a set of instructions). Furthermore, the browser module 532 may include an embedded search-engine tool 534 (or a set of instructions) and/or an embedded editing and classification tool 536 (or a set of instructions). Note that the embedded search-engine tool 534 may be provided by a remotely located search engine. This tool may perform the functions of: monitoring the user interface 514 for a user input; transmitting a user request (such as search query) using the communication module 528; receiving search results (such as documents or images) using the communication module 528; and displaying at least some of these results in an appropriate format (such as that specified by editing instructions associated with the documents or images) using the display 516.

In addition, in some embodiments the memory 524 includes one or more stored web pages and/or documents 538, and optionally an encryption module 540 (or a set of instructions).

Note that computer 500 may include fewer components or additional components, two or more components may be combined into a single component, and/or a position of one or more components may be changed. For example, in embodiments where the computer 500 is coupled to a local server, one or more of the modules and/or applications in the memory 524 may be stored in a server computer at a different location than the user. In addition, the various modules and sub-modules may be rearranged and/or combined.

Figure 6:
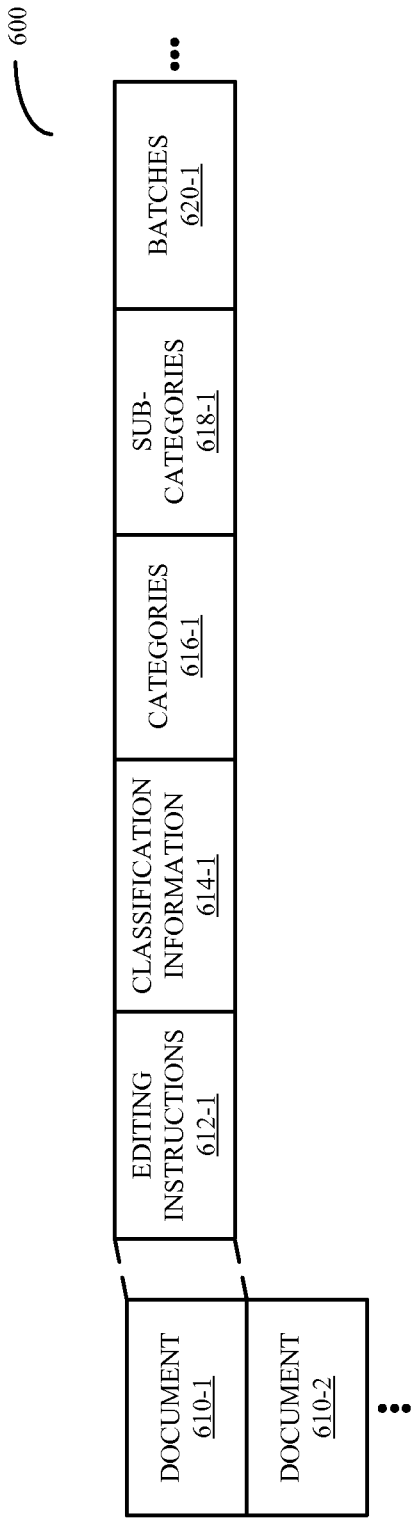
FIG. 6 is a block diagram illustrating a data structure in accordance with an embodiment of the present invention.

We now discuss data structures that may be used in the system 100 (FIG. 1), the computer system 400 (FIG. 4), and/or the computer 500. In particular, FIG. 6 presents a block diagram illustrating a data structure 600 in accordance with an embodiment of the present invention. This data structure may include information associated with documents 610. Furthermore, a given document (such as document 610-1) the data structure 600 may include editing instructions 612-1, classification information 614-1, as well as categories 616-1, sub-categories 618-1, and/or batches 620-1 associated with the document 610-1.

Figure 7:
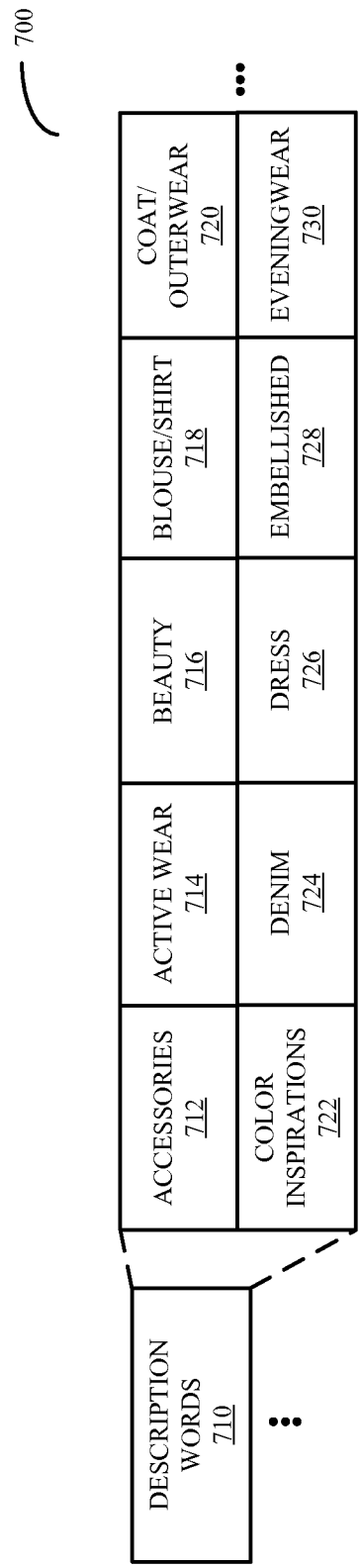
FIG. 7 is a block diagram illustrating a data structure in accordance with an embodiment of the present invention.

FIG. 7 presents a block diagram illustrating a data structure 700 in accordance with an embodiment of the present invention. This data structure may include description words 710 (such as categories 616 in FIG. 6). In particular, the description words 710 may include types of clothing, such as: accessories 712, active wear 714, beauty 716, blouse/shirt 718, coat/outerwear 720, color inspirations 722, denim 724, dress 726, embellished 728, and/or eveningwear 730.

Note that that in some embodiments of the data structures 600 and/or 700 there may be fewer or additional components, two or more components may be combined into a single component, and/or a position of one or more components is changed.

While the preceding discussion has used images (such as, fashion images) as an illustrative example, embodiments of the system, process, and technique may be applied to organizing other types of documents and/or content. In particular, these techniques may facilitate the determining classification information and the identification of content in documents (such as photographs, text, speech, film, video, etc.) which include information that has subjective value or relevance, be it in popular culture or in other subject areas. Note that in some embodiments this subjective value is dynamic as a function of time. Furthermore, a subset of the organized documents may be provided when requests and/or search queries are provided to the system (such as the system 100 in FIG. 1). Thus, these techniques are well suited for use in conjunction with search engines, including those implemented on the Internet and/or an intranet.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing information associated with documents, comprising:
    receiving the documents, wherein the documents include images;
    determining a first set of editing instructions and classification information associated with the documents using data-processing software, wherein the data-processing software determines the first set of editing instructions and classification information using at least one of a spatial filter or a frequency filter, and wherein the classification information includes attributes associated with at least some of the documents;
    providing the images and the first set of editing instructions and classification information to a group of individuals;
    receiving a second set of editing instructions and classification information associated with the documents, wherein the second set of editing instructions and classification information are generated by the group of individuals and include modifications and additions to the first set of editing instructions and classification information, and wherein the second set of editing instructions and classification information include subjective comments about content in the document;
    storing the documents and the second set of editing instructions and the classification information in a non-transitory computer-readable medium, wherein the second set of editing instructions and the classification information facilitate searches for the content in the stored documents;
    receiving a request for information that is associated with a time-varying subjective value;
    identifying the information by searching through the stored documents using the second set of editing instructions and the classification information; and
    providing the information in response to the request, wherein the information includes multiple versions of at least one of the documents, and
    wherein the multiple versions are, at least in part, based on different editing instructions and classification information in the second set of editing instructions and classification information from different individuals in the group of individuals, which include different identified subjective content, thereby providing different images that reflect the time-varying subjective value.

2. The method of claim 1, wherein the information is provided to an individual or an entity that is other than that from which the documents were received or the group of individuals.

3. The method of claim 1, wherein the group of individuals has a professional relationship with an organization that provides a system that receives the documents and determines the first set of editing instructions and classification information.

4. The method of claim 3, wherein the group of individuals are external to the organization.

5. The method of claim 1, further comprising detecting errors in the first set of editing instructions and classification information or the second set of editing instructions and classification information.

6. The method of claim 5, further comprising correcting the errors.

7. The method of claim 1, wherein the images include photographs taken at a fashion show.

8. The method of claim 1, wherein the images include photographs taken at a tradeshow.

9. The method of claim 1, wherein the classification information in the first set of editing instructions and classification information or the second set of editing instructions and classification information includes colors.

10. The method of claim 1, wherein the classification information in the first set of editing instructions and classification information or the second set of editing instructions and classification information includes types of clothing.

11. The method of claim 1, wherein the editing instructions in the first set of editing instructions and classification information or the second set of editing instructions and classification information include cropping instructions.

12. The method of claim 11, wherein the cropping instructions for a given document associated with the second set of editing instructions and classification information include a history of the cropping instructions generated by individuals in the group of individuals.

13. The method of claim 1, wherein the editing instructions and classification information for a given document associated with the second set of editing instructions and classification information include distinct contributions from individuals in the group of individuals.

14. The method of claim 1, further comprising accepting or rejecting editing instructions and classification information for a given document associated with the first set of editing instructions and classification information or the second set of editing instructions and classification information.

15. The method of claim 1, wherein a given document and the associated editing instructions in the second set of editing instructions and classification information in the non-transitory computer-readable medium are stored in a hierarchical data structure based on classification information associated with the given document; and
   wherein the given document is associated with the second set of editing instructions and classification information.

16. The method of claim 15, wherein the hierarchical data structure includes categories and groups of documents;
   wherein the given document is assigned to a given category and one or more groups of documents based on the classification information associated with the given document; and
   wherein the given document is associated with the second set of editing instructions and classification information.

17. The method of claim 16, wherein the given document is further assigned to the given category based on a time when the given document was received or a geographic location associated with the given document.

18. The method of claim 1, further comprising:
   receiving another request for information from a client;
   identifying a subset of the documents based on the other request, wherein the subset of the documents is identified based on the classification information associated with the subset of documents associated with the second set of editing instructions; and
   providing the subset of the documents and associated editing instructions in the second set of editing instructions and classification information to the client; and
   wherein the associated editing instructions define formats in which the subset of the documents are to be displayed.

19. A non-transitory computer program product for use in conjunction with a computer system, the computer program product comprising a computer-readable storage medium and a computer-program mechanism embedded therein for configuring the computer system, the computer-program mechanism including:
   instructions for receiving documents, wherein the documents include images;
   instructions for determining a first set of editing instructions and classification information associated with the documents using data-processing software, wherein the data-processing software determines the first set of editing instructions and classification information using at least one of a spatial filter or a frequency filter, and wherein the classification information includes attributes associated with at least some of the documents;
   instructions for providing the images and the first set of editing instructions and classification information to a group of individuals;
   instructions for receiving a second set of editing instructions and classification information associated with the documents, wherein the second set of editing instructions and classification information are generated by the group of individuals and include modifications and additions to the first set of editing instructions and classification information, and wherein the second set of editing instructions and classification information include subjective comments about content in the documents;
   instructions for storing the documents and the second set of editing instructions and the classification information in a non-transitory computer-readable medium, wherein the second set of editing instructions and the classification information facilitate searches for the content in the stored documents;
   instructions for receiving a request for information that is associated with a time-varying subjective value;
   instructions for identifying the information by searching through the stored documents using the second set of editing instructions and the classification information; and
   instructions for providing the information in response to the request, wherein the information includes multiple versions of at least one of the documents, and
   wherein the multiple versions are, at least in part, based on different editing instructions and classification information in the second set of editing instructions and classification information from different individuals in the group of individuals, which include different identified subjective content, thereby providing different images that reflect the time-varying subjective value.

20. A computer system, comprising:
a processor;
memory;
a program module, wherein the program module is stored in the memory and configured to be executed by the processor, the program module including:
instructions for receiving documents, wherein the documents include images;
instructions for determining a first set of editing instructions and classification information associated with the documents using data-processing software, wherein the data-processing software determines the first set of editing instructions and classification information using at least one of a spatial filter or a frequency filter, and wherein the classification information includes attributes associated with at least some of the documents;
instructions for providing the images and the first set of editing instructions and classification information to a group of individuals;
instructions for receiving a second set of editing instructions and classification information associated with the documents, wherein the second set of editing instructions and classification information are generated by the group of individuals and include modifications and additions to the first set of editing instructions and classification information, and wherein the second set of editing instructions and classification information include subjective comments about content in the documents;
instructions for storing the documents and the second set of editing instructions and the classification information in a non-transitory computer-readable medium, wherein the second set of editing instructions and the classification information facilitate searches for the content in the stored documents;
instructions for receiving a request for information that is associated with a time-varying subjective value;

instructions for identifying the information by searching through the stored documents using the second set of editing instructions and the classification information; and instructions for providing the information in response to the request, wherein the information includes multiple versions of at least one of the documents; and wherein the multiple versions are, at least in part, based on different editing instructions and classification information in the second set of editing instructions and classification information from different individuals in the group of individuals, which include different identified subjective content, thereby providing different images that reflect the time-varying subjective value.

* * * * *